United States Patent [19]
Hillsberg et al.

[11] Patent Number: 5,996,749
[45] Date of Patent: *Dec. 7, 1999

[54] ADJUSTABLE COMPARTMENT SYSTEM FOR A CARRYING CASE, A STORAGE CASE AND THE LIKE

[75] Inventors: Alan Hillsberg, Flushing; Robert Stein, Harrison, both of N.Y.

[73] Assignee: Showcase Technologies, LLC, Flushing, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/749,100

[22] Filed: Nov. 14, 1996

[51] Int. Cl.⁶ ............................. A45C 5/12; A45C 13/04
[52] U.S. Cl. ..................... 190/109; 190/110; 190/122; 206/320; 220/545
[58] Field of Search ..................... 190/109, 110, 190/122; 220/544, 545; 206/320; 211/184

[56] References Cited

U.S. PATENT DOCUMENTS

| | | | |
|---|---|---|---|
| 1,037,912 | 9/1912 | Howard | 220/544 |
| 1,093,222 | 4/1914 | Wheary . | |
| 1,224,250 | 5/1917 | Wheary . | |
| 1,292,493 | 1/1919 | Logan . | |
| 1,849,565 | 3/1932 | Brady | 190/110 |
| 1,901,895 | 3/1933 | Cheney . | |
| 2,153,123 | 4/1939 | Ruck | 220/545 |
| 2,628,694 | 2/1953 | Kushner . | |
| 2,726,661 | 12/1955 | Vallet . | |
| 3,125,198 | 3/1964 | Stark | 190/110 |
| 3,381,782 | 5/1968 | Ikelheimer | 190/110 X |
| 3,491,909 | 1/1970 | Ikelheimer | 190/109 X |
| 3,962,010 | 6/1976 | Riou et al. | 190/122 X |
| 4,735,324 | 4/1988 | Wilcex | 220/544 X |
| 4,770,314 | 9/1988 | Giesler | 220/544 |
| 4,787,488 | 11/1988 | Campanini | 190/109 X |
| 5,007,510 | 4/1991 | Houng | 190/122 |
| 5,573,114 | 11/1996 | Cyr | 206/316.2 X |

FOREIGN PATENT DOCUMENTS

| | | | |
|---|---|---|---|
| 543982 | 9/1959 | Belgium | 190/122 |
| 731956 | 9/1932 | France | 190/109 |
| 1021051 | 2/1953 | France | 190/109 |
| 1235491 | 5/1959 | France . | |
| 1253921 | 1/1961 | France | 190/109 |
| 2447694 | 10/1980 | France | 190/109 |
| 1958686 | 6/1971 | Germany | 190/122 |
| 6811304 | 2/1970 | Niger | 190/109 |
| 629955 | 11/1949 | United Kingdom . | |
| 1549425 | 8/1979 | United Kingdom | 190/122 |

OTHER PUBLICATIONS

Article entitled "Case Study" by Dan Costa, pp. 75–82 as appeared in Mobile Office, Jan. 1996.

*Primary Examiner*—Sue A. Weaver
*Attorney, Agent, or Firm*—Ohlandt, Greeley, Ruggiero & Perle, L.L.P.

[57] ABSTRACT

There is provided a system for forming compartments in a carrying case or attache case to stow various items, such as a laptop or notebook computer. The system comprises a plurality of support bars disposed along the inner walls of the carrying case and a plurality of partition bars coupled to the frame. Each support bar has a pair of substantially parallel rails disposed at its upper side and a longitudinal surface disposed at its lateral side. The parallel rails form an equidistant channel therebetween. Each partition bar that has an end portion for coupling to a respective support bar. The end portion has an appendage that is disposed in the channel of the support bar and a planar end surface that is positioned adjacent to the longitudinal surface of the support bar. Accordingly, each elongated partition bar subdivides the housing and forms a compartment on either side of the partition bar.

28 Claims, 5 Drawing Sheets

ADJUSTABLE COMPARTMENT SYSTEM FOR A CARRYING CASE, A STORAGE CASE AND THE LIKE

BACKGROUND OF THE INVENTION

I. Field of the Invention

The present invention relates generally to adjustable compartment systems for carrying or storage cases. More particularly, the present invention relates to a system for subdividing the inside of a case into adjustable inner compartments that may be altered to accommodate the physical dimensions of various stowable items.

II. Description of the Prior Art

Carrying cases, such as attache cases, are used to carry a wide variety of items, such as business or personal files, books, clothing and electronic equipment. Most travelers prefer to carry only one case for a single trip. Thus, a carrying case often requires extra pockets and compartments to store all items. For example, soft carrying cases are often used to store a laptop or notebook computer and its accessories along with files, books, clothing or other items needed for a trip.

Such cases having hard outer shells provide substantial protection from breakage for their contents. The protective shell of a hard case is typically made of durable plastic or aluminum and, thus, is lightweight and relatively inexpensive. Hard cases have inner compartments or pockets to store various items but have limited provisions for adjusting the dimensions of the compartments or pockets. In particular, hard cases lack the versatility to hold different products in a safe manner because they use soft, foam inserts that must be custom made for each item stored in the case.

Carrying cases or containers having adjustable inner compartments are known. Such cases or containers have rigid base frames secured to their inner walls and flexible dividers that hook to the base frames and form compartments. For example, U.S. Pat. No. 1,901,895 to S. E. Cheney, which issued on Mar. 21, 1933; and U.S. Pat. No. 2,726,661 to E. Vallet, which issued on Dec. 13, 1955, each provides a container having a rigid base frame and flexible dividers for forming compartments in the container. In particular, U.S. Pat. No. 1,901,895 provides a divider having elastic straps, and U.S. Pat. No. 2,726,661 provides a divider having three rods attached to a tension spring. For both patents, the flexible dividers extend a fixed span across the width of the case, but provide adjustability along the length of the case.

The dividers of the above patents are flexible and, thus, do not adequately secure items in an inner compartment. Such flexible dividers allow items to shift and, thus, bump other items and/or the inner walls of the case. Also, each divider connects to opposite sides across the width of the container in order to form the compartments. Thus, although the length of each compartment is adjustable, the width and height remain fixed. Accordingly, each compartment may have a great deal of wasted space, as well as permit its contents to shift and become damaged.

Carrying cases having rigid dividers for forming inner compartments are also known. A rigid divider provides firm support so that an item is less likely to bump the case's inner walls or other items in the case. For example, U.S. Pat. No. 1,093,222 to G. H. Wheary, which issued on Apr. 14, 1914; U.S. Pat. No. 1,224,250 also to G. H. Wheary, which issued on May 1, 1917; U.S. Pat. No. 2,628,694 to M. Kushner, which issued on Feb. 17, 1953; British Patent Specification No. 629,955, which was published on Oct. 3, 1949; and French Patent No. 1,235,491, which was published on May 30, 1960, each provides a rigid frame and an adjustable rigid divider for forming compartments and separating items within the case. In particular, U.S. Pat. Nos. 1,093,222 and 1,224,250, provide rigid bands that engage perforated frame bars on opposite sides of the case. U.S. Pat. No. 2,628,694 and the above French patent provide rigid, planar boards that slide along oppositely disposed frame bars or rods. The above British patent specification provides a rigid rod that slides along frame rods mounted to opposite sides of the case's inner surface.

However, similar to the flexible dividers, each rigid divider of the above patents extends from one side of the case to the other side, linking at opposite ends, to form compartments. Accordingly, the rigid divider is adjustable along the length of the case, not the width or height. In summary, the cases of the above patents provide only one dimension support for three-dimensional objects or items. Therefore, each compartment has wasted space and inadequate support for its contents due to the limited adjustability of its respective dividers.

The present invention is a system for forming adjustable compartments in a carrying case, such as an attache case, that provides two dimensional support of items stored in the compartments.

SUMMARY OF THE INVENTION

Against the foregoing background, it is a primary object of the present invention to provide a system for forming, as desired, a plurality of compartments or cavities in a carrying case in which each compartment may be adjusted to conform, as desired, lengthwise and widthwise.

It is another object of the present invention to provide such a system which includes a frame disposed in the carrying case and one or more partition bars adapted to extend from one point on the frame.

It is a further object of the present invention to provide such a system that has partition bars that simultaneously couple and secure in place without the need of separate securing means.

It is a still further object of the present invention to provide such a system in which the partition bars may have different lengths, provided no bar is longer than the length or width of the carrying case.

It is still another object of the present invention to provide such a system in which each partition bar has means for maintaining its desired position.

It is a yet further object of the present invention to provide such a system in which the partition bars easily move, relative to the frame, when grasped by a user, but otherwise remain securely in position once placed into position by the user.

To accomplish the foregoing objects and advantages, the present invention is a system for forming a plurality of compartments in a housing which, in brief summary, comprises a first bar and a second bar having an end portion for coupling to the first bar. The first bar has a first rail and a second rail substantially parallel to the first rail so that a channel is formed between the first and second rails. Also, the end portion of the second bar has an appendage disposed in the channel of the first bar that has a pair of walls aligned with the first and second rails.

The first bar also has a longitudinal surface in which the first rail is disposed lengthwise along one side of the longitudinal surface. In addition, the end portion of the second bar has an end surface that is positioned adjacent to the longitudinal surface of the first bar.

The present invention is generally a system which comprises a frame disposed in a housing having at least one support bar disposed adjacent to an inner surface of the housing, and means for securing the frame to the housing. At least one partition bar having a substantially rigid structure is adapted to be coupled to the support bar. The partition bar extends from the support bar, in a substantially perpendicular direction, to subdivide the housing and form a compartment on either side of the partition bar.

More particularly, the system includes a frame disposed along the inner walls of the carrying case and a plurality of component bars adapted to be secured to the frame. Each component bar has a substantially rigid structure to maintain securely a particular item within the respective compartment formed by the frame and component bars. In addition, each component bar only requires support at one end, namely a single coupling to the frame, to maintain its set position. Accordingly, the component bars of the present invention are not limited to extending across the entire case, thus permitting the formation of compartments that are adjustable in at least two dimensions.

BRIEF DESCRIPTION OF THE DRAWINGS

The foregoing and still further objects and advantages of the present invention will be more apparent from the following detailed explanation of the preferred embodiments of the invention in connection with the accompanying drawings.

DETAILED DESCRIPTION OF THE PREFERRED EMBODIMENT

The present invention is a system or apparatus for providing compartments within a wide variety of relatively rigid cases, such as a container, carrying case, trunk, or tote box, having different sizes, configurations and material compositions. The system may be integrated into a new case, or may be installed in an existing case. In addition, although permanent installation is preferred, the system may be temporarily installed without damaging the case and, thus, is not restricted to permanent mounting in the case.

Figure 1:
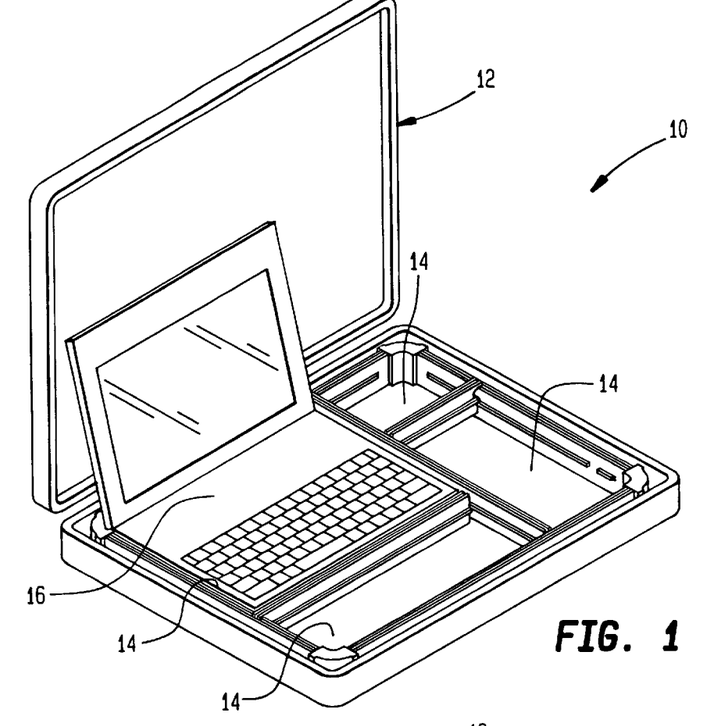
FIG. 1 is a perspective view of the system of the present invention as positioned in a typical carrying case.

Referring to the drawings and, in particular, to FIG. 1, there is provided a system of the preferred embodiment, which is generally represented by reference numeral 10, for forming a plurality of compartments in a housing. As shown in FIG. 1, the housing 12 of the preferred embodiment is an attache case, and the compartments 14 formed by the system 10 have linear sides that are generally rectangular in shape. Accordingly, each compartment 14 may be adjusted to accommodate the rectangular, square or straight-sided form of many common items including files, books, camera equipment and electronic equipment, such as the notebook computer 16 shown in FIG. 1. Also, each compartment 14 may be adjusted to secure rounded or curved items, such as a camera lens, within its adjustable linear sides.

A feature of the present invention is the ability to support its contained items, particularly square or straight-sided items, along two dimensions, namely their length and width. Such two dimensional support prevents the items from shifting within their respective compartments and, thus, avoid possible damage to the item. For example, as shown in FIG. 1, the notebook computer 16 is supported at all four sides in one compartment 14.

Figure 2:
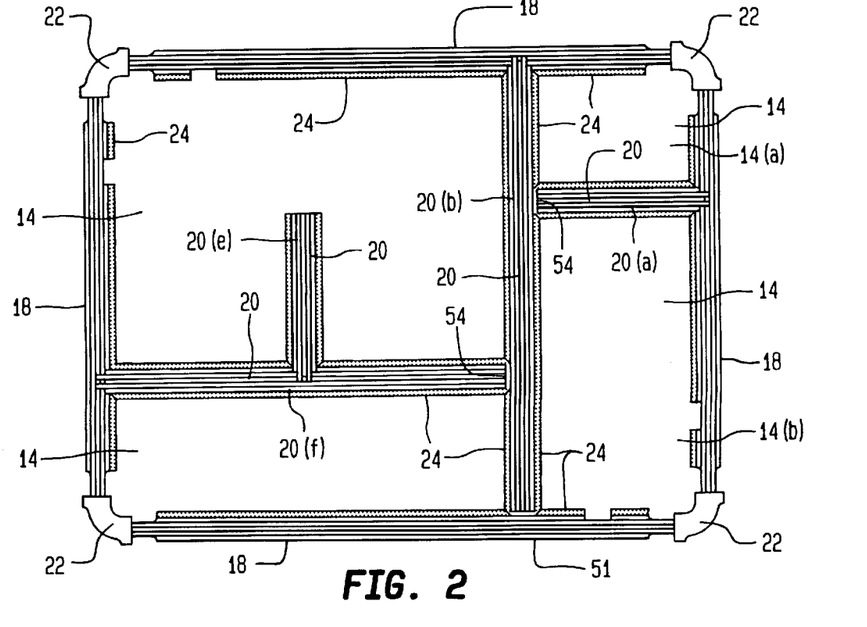
FIG. 2 is a top planar view of the system of FIG. 1 being removed from the carrying case.

Referring to FIG. 2, the system 10 comprises a frame that includes a plurality of elongated support bars 18 adapted to be positioned at an inner surface of the housing 12 (shown in FIG. 1), and one or more partition bars 20 adapted to be coupled to the frame's support bars. The system 10 also includes a corner mounting bracket 22 disposed at each corner to connect respective support bars 18.

As shown in FIG. 1, there are four individual bars 18 and four individual corners 22. It is known that the frame can be one integral unit or bar formed, for example, by extension which bar can be beat along its extant to form a rectangle. The five ends of the unit can be secured together in place by conventional means, such a post or bar. This integral unit embodiment will reduce manufacturing and assembly costs, as well as make the frame easier to assemble.

As a third frame alternative, each corner 22 can be integrally molded to a bar 18 thereby possibly making assembly easier than the first frame alternative.

For any of the frame alternatives, a foam or rubber protective stripping 24 is disposed along the sides of each support bar 18 and partition bar 20 to securely hold and protect a particular item within the respective compartment 14.

The system 10 allows a user to design compartments of any dimensional length and width in order to hold products, yet change the configuration at any time to adapt to another product. The system 10 of the preferred embodiment includes four elongated support bars 18 that form the frame and one or more partition bars 20. Although the support bars 18 and partition bars 20 have substantially similar structures, they are provided herein with different reference names simply to distinguish their different functions. In particular, the support bars 18 that form the frame are mounted to the inner surface of the housing 12, whereas the partition bars 20 are movable and are adapted to be coupled to the support bars for adjustable positioning thereon.

Figure 3:
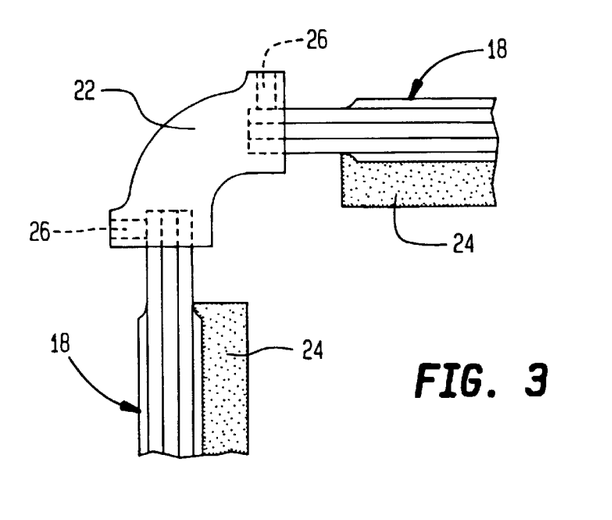
FIG. 3 is an enlarged view of the corner mounting bracket of FIG. 2.

Referring to FIG. 3, the support bars 18 may be installed against the inner surface of the housing 12 by any conventional means, such as, for example, rivets or screws, that secures objects to the inner surface of a carrying case. For the preferred embodiment, screws enter from the exterior of the housing 12 (shown in FIG. 1) and screw into screw receiving holes 26 of each corner mounting bracket 22. The corner mounting brackets 22, in turn, receive the ends of the support bars 18 for firm mounting of the frame inside the housing 12. The support bars 18 are firmly held by friction within the brackets 22.

Figure 4:
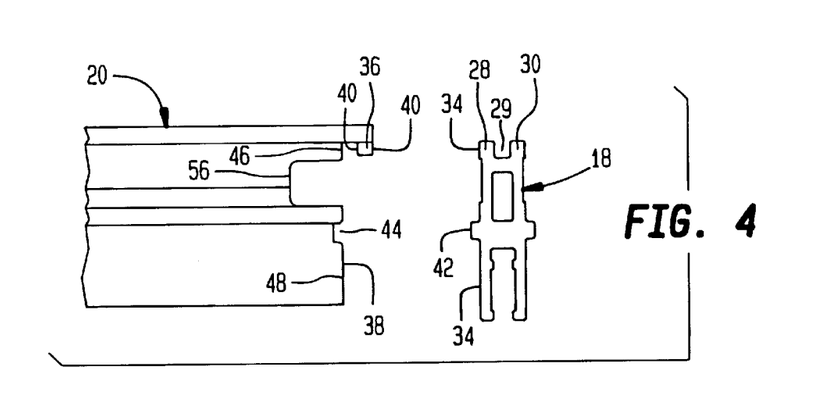
FIG. 4 is a side elevational view of two separate bars, namely a support bar and a partition bar of the system, positioned perpendicular to each other.
Figure 5:
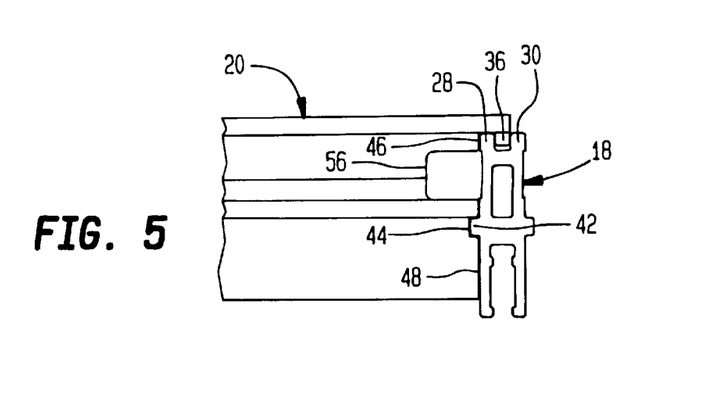
FIG. 5 is a side elevational view of the bars of FIG. 4 in which the partition bar has been coupled to the support bar.
Figure 6:
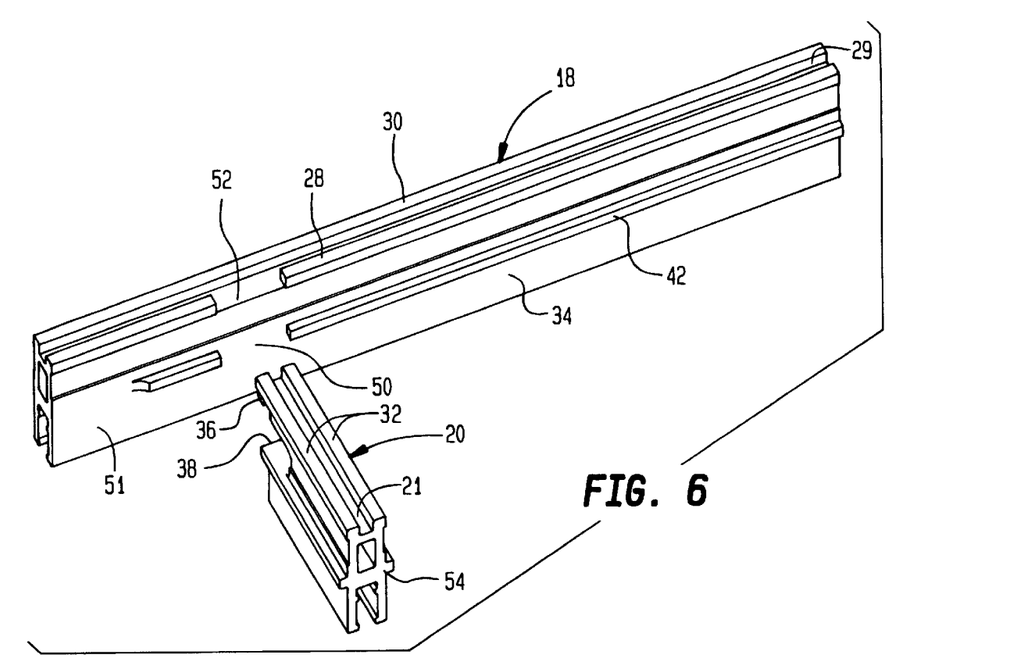
FIG. 6 is an exploded perspective view of the bars of FIG. 4.

Referring to FIGS. 4 and 5, each support bar 18 has a pair of substantially parallel rails, namely a first rail 28 and a second rail 30, in which that an equidistant channel 29 is formed between them. The first and second rails 28, 30 are disposed at an upper side of the support bar 18, and a longitudinal surface 34 is disposed at a lateral side of the support bar. Likewise, each partition bar 20, as shown in FIG. 6, has a pair of rails 32 that form a channel 21 therebetween. The partition bar 20 has, in addition, an end portion 38 that will be discussed below.

When the partition bar 20 and the support bar 18 are coupled, an appendage 36 at the end portion 38 of the partition bar traverses over the first rail 28 and is disposed between the first and second rails 28, 30 of the support bar 18. The appendage 36 includes a pair of planar sides or walls 40 that are opposite and substantially parallel to each other. When situated in the equidistant channel 29, the appendage's walls 40 will be aligned with, and adjacent to, the first and second rails 28, 30.

The end portion 38 of each partition bar 20 may be coupled to the longitudinal surface 34 of the respective support bar 18. The longitudinal surface 34 of the support bar 18 includes a lateral rail 42 that extends lengthwise along the longitudinal surface 34. Correspondingly, the partition bar 20 includes a lateral rail groove 44 for receiving the lateral rail 42 of the support bar 18.

The end portion 38 of the partition bar 20 includes an upper planar surface 46 and a lower planar surface 48 with each planar surface in directional alignment with each other. The first rail 28 of the support bar 18 is disposed between the appendage 36 and the upper planar surface 46, and the lower planar surface 48 is supported against the longitudinal surface 34 of the support bar. Thus, the appendage 36 is supported against the first rail 28 in one direction, and the lower planar surface 48 is supported against the longitudinal surface 34 in an opposite direction. The upper and lower planar surfaces 46, 48 and the appendage 36 of the partition bar 20 provide a secure coupling to the support bar 18. In addition, the lateral rail 42 and the lateral rail groove 44 provide further support to ensure a secure coupling between the partition bar 20 and the support bar 18.

Figure 7:
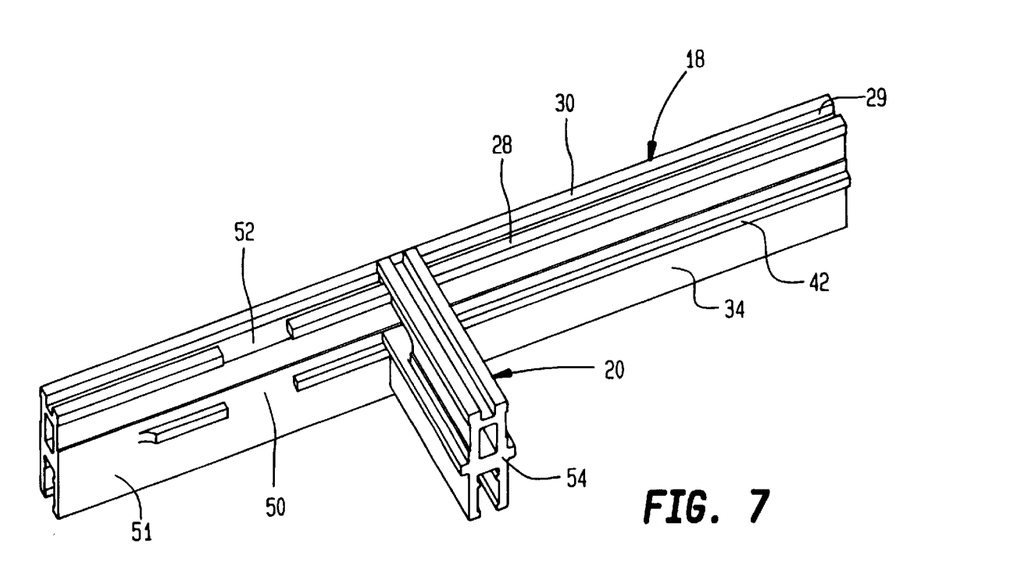
FIG. 7 is a perspective view of the bars of FIG. 5.

Referring to FIGS. 6 and 7, each partition bar 20 couples to a longitudinal surface 34 of a support bar 18. The first rail 28 of the support bar 18 is disposed lengthwise along one side of the longitudinal surface 34, and the second rail 30 is disposed substantially parallel to the first rail to form a channel 29. To couple to the support bar 18, the partition bar 20 is coupled to the support bar at a particular section that includes the lateral rail 42. The lateral rail 42 has a flat or non-railed area 51 that permits the end portion 38 of the partition bar 20 to pass through so that it may be positioned flush against the longitudinal surface 34 of the support bar 18. Once the end portion 38 of the partition bar 20 is adjacent to the longitudinal surface 34, the partition bar may slide lengthwise along the support bar 18 as shown in FIG. 7. In addition, the channel 29 in the top surface of support for 18 receives the appendage 36 of the end portion 38 of the partition bar 20. Once the appendage 36 is in channel 29 and end portion 38 is adjacent or contacts surface 34, the partition bar 20 may slide lengthwise along the support bar 18. In the alternative, the partition bar 20 can slide into the support bar 18 from either end.

As shown in FIGS. 6 and 7, slot 51 is preferably at the edge or end of lateral rail 42 and in a more preferred embodiment, slots 51, are placed at each edge of lateral rail 42 on each partition 18, while slots 51 can theoretically be placed anywhere along lateral rail 42, it is preferred at the ends or edges since that is where it is preferred to engage or disengage the partition bar 20 from support bar 18.

Although the partition bar 20 may be easily adjusted by a user, once set in position by the user, the partition bar 20 remains virtually immovable. In particular, the partition bar 20 moves easily relative to the support bar 18 when a user grasps the partition bar at the end portion 38 near the interlocked section (where the partition bar 20 engages support bar 18). In contrast, when the user grasps the partition bar 20 further down and away from the interlocked section, near a distal end portion 54, the partition bar substantially resists movement and is virtually locked in position. Thus, during normal use when a particular item is held within the compartment formed by the support bars 18 and one or more partition bars 20, the partition bars will stay in position and will not move.

Accordingly, by grasping near the interlocked section, the user is able to advance both end portions 38, 54 of the partition bar linearly together so that the partition bar moves easily. However, by grasping the distal end portion 54, the user has less control over the partition bar 20 and is not able to advance both end portions 38, 54 linearly together and, thus, the partition bar is prevented from moving.

Figure 8:
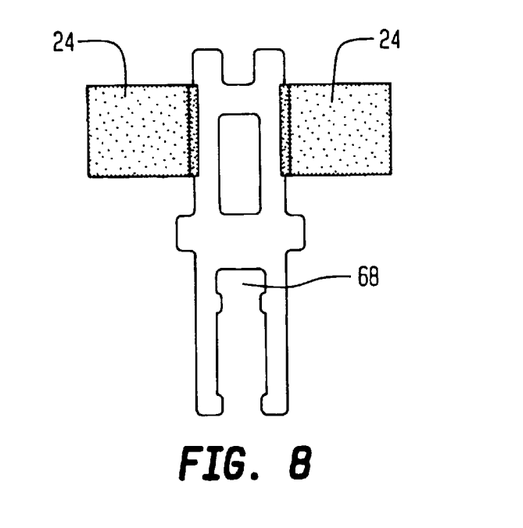
FIG. 8 is a side sectional view of a bar and respective protective stripping of FIG. 2.

Referring to FIG. 8, a foam or rubber protective stripping 24 may be positioned along the sides of each support bar 18 and each partition bar 20, shown in FIG. 2, to prevent an item held within a particular compartment 14 from contacting the outer surfaces of the bars. For the preferred embodiment, an adhesive is provided on one side of the protective stripping 24 for attachment to an outer surface of any bar, and an impression is molded in one or both sides of each bar for proper placement of the protective stripping. In addition, such protective stripping 24 provides protection and secure storing of the item in the respective compartment.

Referring again to FIGS. 4 and 5, a retaining groove 56 may be provided at an upper side of each partition bar 20. The retaining groove 56 is used to receive and support the foam or rubber protective stripping 24 that extends the entire length of the support bar 18. For the preferred embodiment, the retaining groove 56 is a rectangular form having rounded corners, as shown in FIGS. 4 and 5. The retaining groove 56 also provides a resistive force when sliding the partition bar 20 against the support bar 18. This resistive force also eliminates vibration or movement of the partition bar 20 when placed at a desired position.

Figure 9:
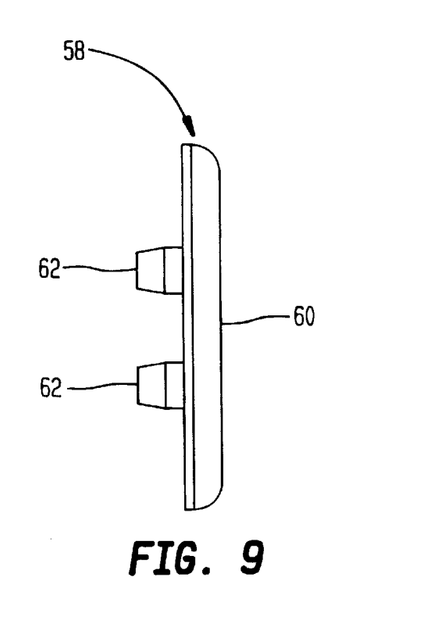
FIG. 9 is a side elevational view of an end cap provided at the distal end of the partition bars of FIG. 2.

A plastic or rubber end cap 58, shown in FIG. 9, may be disposed at the distal end portion 54, shown in FIG. 2, of each partition bar 20 opposite the end portion 38. As shown in FIG. 9, the end cap 58 includes a smooth, rounded surface 60 on one side for protective handling of the respective partition bar 20 for the user and a pair of protrusions 62 on the other side to attach the end cap to the respective partition bar. Also, as shown in FIG. 2, the distal end portion 54 of each partition bar 20 is not coupled to another bar. Thus, an item may be secured between the end cap 58 at the distal end 54 and the side surface of partition bar 20(b). Accordingly, the end cap 58 provides a smooth handling surface at the distal end 54 that may be used to hold and protect items that come in contact with the end cap. In a preferred embodiment, the rounded surface 60 is about one quarter inch thick.

The present invention is designed and packaged for economic mass production. For example, the preferred embodiment includes component bars, namely the support bars 18 and the partition bars 20, having the same qualities and modular design. Also, the partition bars 20 are provided in interval sizes, such as two inches long, four inches long, six inches long and so on. Thus, a specified number of different size component bars are supplied with each package. Therefore, each partition bar 20 does not necessarily extend from an interlocking or coupling end to another bar.

Referring again to FIG. 2, it is important to understand that the partition bars 20 will also interlock with one another as well as the support bars 18. For example, as shown in FIG. 2, partition bar 20(e) is interlocked to the partition bar 20(f). In addition, only one end of each partition bar 20 must be coupled to a support bar 18 in order for the partition bar to remain at a particular position and support the compartments to either side. For example, as shown in FIG. 2, even though distal end portion 54 of a first partition bar 20(a) is not coupled to a second partition bar 20(b) adjacent to the distal end portion, the first partition bar remains securely in place and provides firm support for the contents of two compartments 14, namely 14(a) and 14(b).

Figure 10:
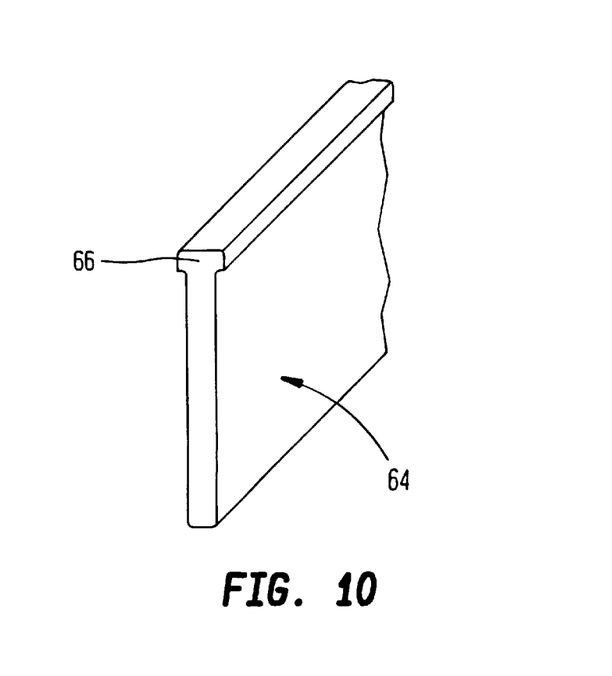
FIG. 10 is an extension that may be disposed at the lower portion of the partition bars of FIG. 2.

Referring to FIG. 10, an extension 64 that is an elongated bar that slide into a bottom portion of a partition bar 20. For deeper cases having substantial depth, the partition bar 20 is not deep enough to extend the entire depth of the such cases. Thus, the extension 64, having the appropriate depth (such as 2 inches, 4 inches and so on), may be attached to adjust and extend the depth of the partition bar 20. As shown in FIGS. 8 and 10, the extension 64 includes a flange 66 that may be disposed in a flange receiving groove 68 of the respective partition bar.

Figure 11:
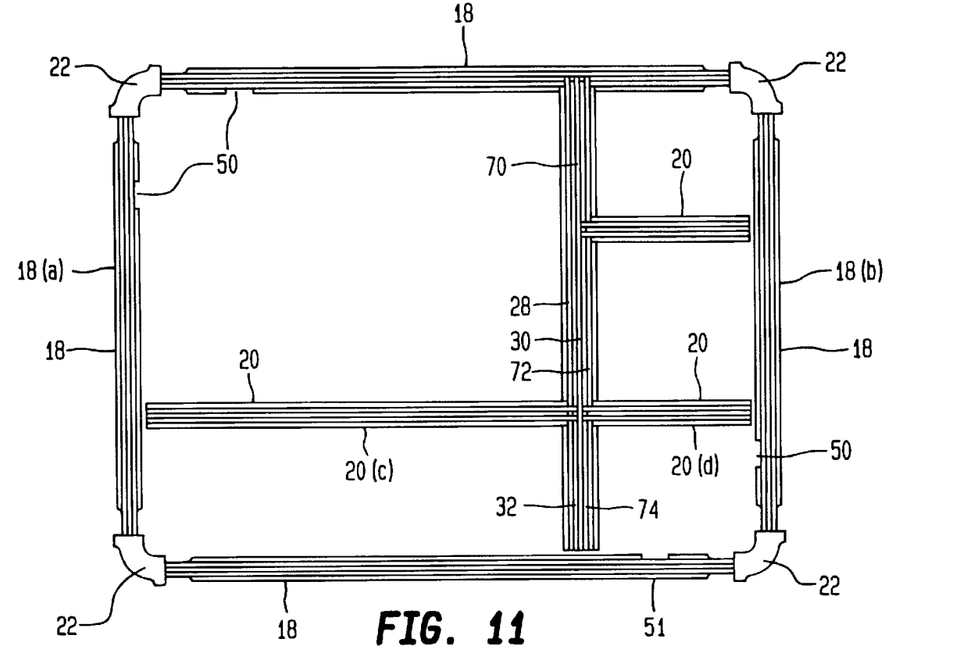
FIG. 11 is a top planar view of an alternative embodiment of the bars of FIG. 2 in which a substitute three-rail bar and an additional two-rail bar are shown.

Referring to FIG. 11, partition bars 20 having only one rail are preferred, however partition bars having multiple rails may also be used. In particular, there is shown in FIG. 11 an alternative embodiment of the present invention that includes a three-rail partition bar 70 that has been substituted for one of the preferred two-rail partition bars 20 shown in FIG. 2, and another two-rail partition bar has been added. In contrast to the two-rail partition bars 20 of the preferred embodiment, the three-rail partition bar 70 has a third rail 72 that is substantially parallel to the first rail 28 and the second rail 30, and a second equidistant channel 74 formed between the second and third rails. The three-rail partition bar 70 provides functionality that is similar to that of the two-rail partition bars 20, however the three-rail partition bar is much wider and, thus, has a higher material cost and requires more space than a two-rail partition bar.

In comparing the alternative embodiment of FIG. 11 to the preferred embodiment of FIG. 2, the preferred partition bars 20 have been flipped so that they couple to three-rail partition bar 70 instead of two support bars, namely 18(a) and 18(b). Also, the three-rail partition bar 70 is capable of supporting two partition bars, such as partition bars 20(c) and 20(d), so that they are directly opposite each other. Therefore, at the expense of higher material costs and more required space, the three-rail partition bar 70 provides additional options for the user. In summary, a wide variety of arrangements are available for the support and partition bars of the present invention, and the configuration and types of component bars used will be dictated by a user's personal preference.

Figure 12:
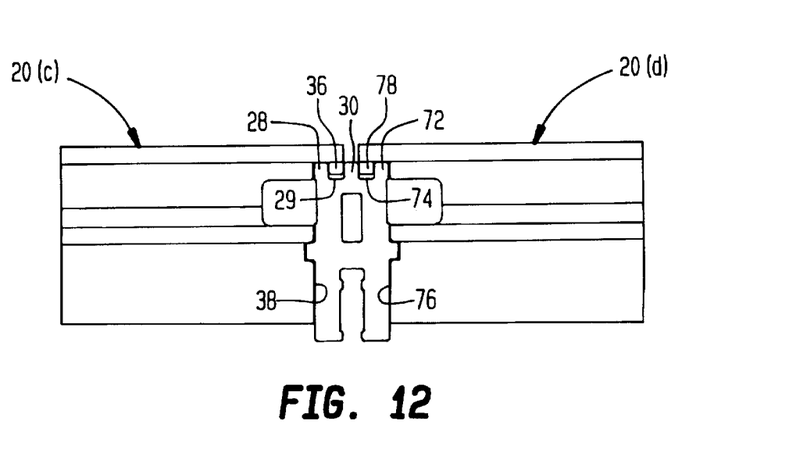
FIG. 12 is a side elevational view of a pair of two-rail partition bar coupled to a three-rail partition bar.

Referring to FIG. 12, the partition bars 20(c) and 20(d) interlock on both lateral sides directly opposite one another of the three-rail partition bar 70. In addition, the third rail 72 of the three-rail partition bar 70 is substantially parallel to the first rail 28 and the second rail 30, and the second equidistant channel 74 is formed between the second and third rails. In view of this second equidistant channel 74, one partition bar 20(d) may be coupled directly across from the opposite partition bar 20(c) so that a second end portion 76 and a second appendage 78 of the partition bar is disposed in the second equidistant channel.

Extra bars that are not used by the user to form a compartment may be conveniently stored away in predesigned pockets made specifically for them. For the preferred embodiment, a formed tray having dimensions designed about the shape of the bars is positioned in the housing 12. The tray may hold shorter bars, such as bars that are two inches or four inches long. Also, a separate saddle bag may be draped over the outside of the housing 12 to hold longer bars.

It is to be understood that while the support bars 18 and the partition bars 20 have been described as a somewhat rigid member, the bar may be made of any semi-rigid material provided each partition bar includes coupling means for simultaneous coupling and securing to its respective support bar. For example, it is preferred that the bars be made of aluminum or plastic, however materials having limited flexibility, such as rubber, may also be used. In addition, the support bars 18 and the partition bars 20 may have virtually any arcuate configuration although straight or linear bars are preferred.

The system of the present invention may be used to securely hold a wide variety of items, particularly items requiring special handling and care. For example, the system may be used to hold products or components that a salesperson would carry to represent his or her company's merchandise. Virtually any item having physical dimensions that will fit in the case will be securely stored by the system. Such items include, but are not limited to, laptop or notebook computers, camera equipment, and their accessories and accompanying equipment.

The invention having been thus described with particular reference to the preferred forms thereof, it will be obvious that various changes and modifications may be made therein without departing from the spirit and scope of the invention as defined in the appended claims.

What is claimed is:

1. A system for forming a plurality of compartments in a housing, comprising:

a first bar including a portion having a first rail and a second rail substantially parallel to said first rail, wherein a channel is formed between said first and second rails; and a second bar having means, adapted to be positioned on one of said first and second rails, for connecting said second bar to said first bar at a position along said channel and simultaneously securing said second bar to first bar at said position, wherein said second bar includes means for receiving a third bar.

2. The system of claim 1, wherein said connecting means is an end portion of said second bar.

3. The system of claim 2, wherein said end portion of said second bar has an appendage that is adapted to be disposed in said channel of said first bar, and wherein said appendage has a pair of walls aligned with said first and second rails.

4. The system of claim 3, wherein said appendage is capable of locking said second bar in place with respect to said first bar upon engagement with said channel of said first bar.

5. The system of claim 3, wherein said pair of walls comprises a first planar side and a second planar side opposite and substantially parallel to said first planar side, and wherein said first planar side is adjacent to said first rail and said second planar side is adjacent to said second rail.

6. The system of claim 3, wherein said first bar includes a longitudinal surface, and said end portion of said second bar couples to said first bar at said longitudinal surface.

7. The system of claim 6, wherein said longitudinal surface is disposed at a lateral side of said first bar.

8. The system of claim 6, wherein said appendage traverses over said first rail and is disposed between said first rail and said second rail of said first bar.

9. The system of claim 6, wherein said longitudinal surface includes a lateral rail extending lengthwise along a portion of said longitudinal surface.

10. The system of claim 9, wherein said lateral rail includes a lateral rail slot for permitting said end portion of said second bar to pass through said lateral rail slot and be positioned against said longitudinal surface of said first bar so that said appendage may be disposed in said channel of said first bar.

11. The system of claim 1, wherein said second bar includes a strip receiving groove for receiving a protective strip to support said protective strip against a longitudinal surface of said first bar.

12. The system of claim 1, further comprising an extension disposed at a lower end portion of said second bar so that said extension extends the depth of said second bar.

13. A system for forming a plurality of compartments in a housing, comprising:

a first bar having a longitudinal surface and a rail disposed lengthwise along one edge of said longitudinal surface; and a second bar having means, adapted to be positioned on said rail, for connecting said second bar to said first bar at a position along said rail and simultaneously securing said second bar to said first bar at said position, wherein said second bar includes means for receiving a third bar.

14. The system of claim 13, wherein said connecting means is an end portion of said second bar.

15. The system of claim 14, wherein said end portion has an appendage for engaging said rail of said first bar and a planar end surface for positioning adjacent to said longitudinal surface of said first bar.

16. The system of claim 15, wherein said end surface includes an upper planar surface, and wherein said rail of said first bar is disposed between said appendage and said upper planar surface.

17. The system of claim 15, wherein said end surface includes a lower planar surface, and wherein said appendage is supported against said rail and said lower planar surface is supported against said longitudinal surface.

18. The system of claim 17, wherein said appendage is supported against said rail in a first direction, and wherein said lower planar surface is supported against said longitudinal surface in a second direction opposite said first direction.

19. The system of claim 15, wherein said longitudinal surface includes a lateral rail extending lengthwise along a portion of said longitudinal surface.

20. The system of claim 19, wherein said lateral rail includes a slot for permitting said end portion to of said second bar to pass through said slot and be positioned against said longitudinal surface of said first bar so that said appendage may engage said rail of said first bar.

21. The system of claim 15, wherein said second bar includes a strip receiving groove for receiving a protective strip to support said protective strip against a longitudinal surface of said first bar.

22. The system of claim 13, wherein said first bar includes a second rail substantially parallel to said rail, and wherein an equidistant channel is formed between said rail and said second rail.

23. The system of claim 13, further comprising an extension disposed at a lower end portion of said second bar so that said extension extends the depth of said second bar.

24. A system for forming a plurality of compartments in a housing, comprising:

a frame disposed in the housing having at least one support bar disposed adjacent to an inner surface of said housing; and at least one partition bar having a substantially rigid structure for connecting said partition bar to said at least one support bar at a position along said support bar and simultaneously securing said partition bar to said at least one support bar at said position, said at least one partition bar extending substantially perpendicular from said at least one support bar to subdivide said housing and form a compartment on either side of said at least one partition bar, wherein said at least one partition bar includes means for receiving a second partition bar to form a compartment on either side of said second partition bar.

25. The system of claim 24, further comprising an extension disposed at a lower end portion of said at least one partition bar so that said extension extends the depth of said partition bar.

26. The system of claim 24, wherein said at least one partition bar includes a first end portion, a second end portion being distal from said at least one support bar, and said substantially rigid structure connectable to said first end portion.

27. The system of claim 26, wherein said substantially rigid structure is effective to permit said at least one partition bar to move relative to said at least one support bar when a linear force is applied to one side of said first end portion and to prevent said at least one partition bar to move relative to said at least one support bar when a linear force is applied to one side of said second end portion.

28. The system of claim 26, wherein said substantially rigid structure is effective to permit said at least one partition bar to move relative to said at least one support bar when said first end portion and said second end portion advance linearly together and to prevent said at least one partition bar to move relative to said at least one support bar when said first end portion and said second end portion do not advance linearly together.

* * * * *